United States Patent [19]

Williams

[11] 4,019,549

[45] Apr. 26, 1977

[54] WOOD SPLITTING APPARATUS

[76] Inventor: Thurston V. Williams, Pead Hill, Wilton, N.H. 03086

[22] Filed: Mar. 19, 1976

[21] Appl. No.: 668,474

[52] U.S. Cl. ........................ 144/193 A; 144/193 E; 254/104

[51] Int. Cl.[2] ........................ A47J 49/02; B27L 7/00

[58] Field of Search ........ 254/104; 144/3 K, 193 R, 144/193 A, 193 D, 193 E, 2 N; 83/928

[56] References Cited

UNITED STATES PATENTS

| | | | |
|---|---|---|---|
| 3,780,779 | 12/1973 | Guy | 144/193 A |
| 3,842,871 | 10/1974 | Jureiwicz | 144/193 A X |
| 3,938,567 | 2/1976 | Dirckson et al. | 144/193 E |

*Primary Examiner*—Othell M. Simpson
*Assistant Examiner*—W. D. Bray
*Attorney, Agent, or Firm*—James H. Grover

[57] ABSTRACT

A wood splitting attachment for a backhoe includes a guide track mounted on the backhoe main boom and a guide track follower attached to the backhoe secondary boom or dipperstick. The follower engages and follows the guide track as the main boom and secondary boom swing toward each other. A wood splitting wedge on the track is driven through a stick of wood pushed along the track by the dipper-stick.

9 Claims, 3 Drawing Figures

FIG. 1
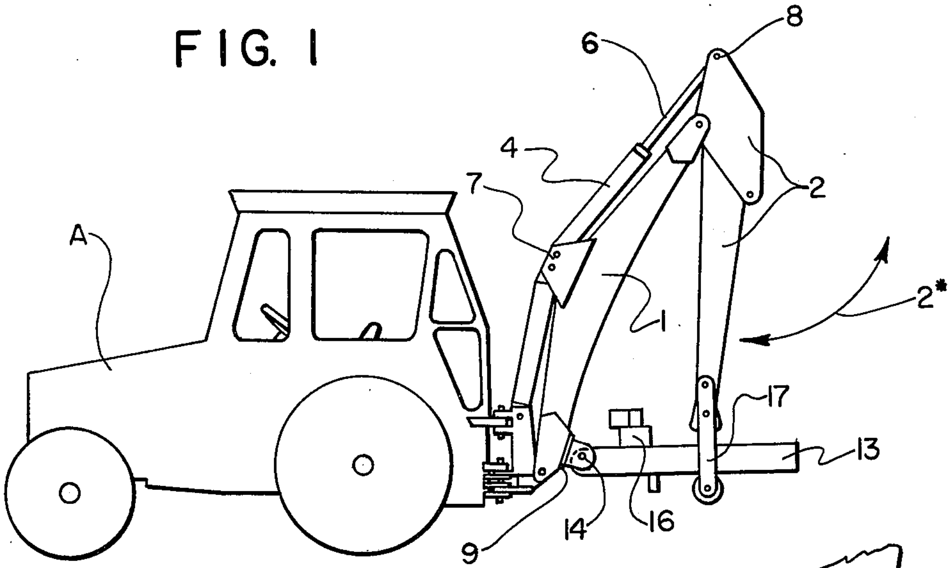
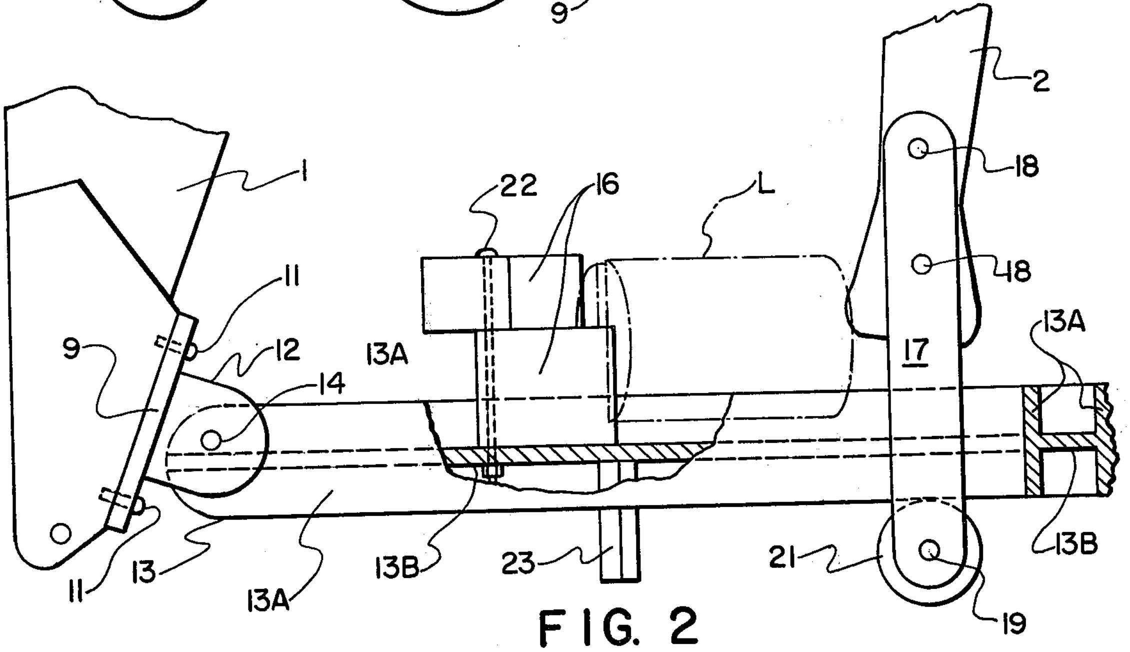
FIG. 2
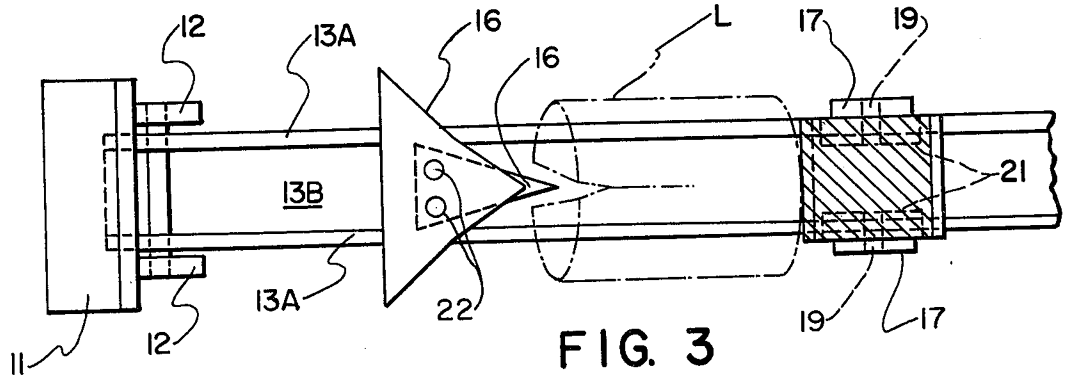
FIG. 3

WOOD SPLITTING APPARATUS

STATEMENT OF INVENTION

According to the invention wood splitting apparatus comprises an attachment for a backhoe with a main boom and a secondary boom pivotted thereto, or the combination of backhoe and attachment, wherein the attachment comprises an elongate guide track, means for mounting the track on the backhoe extending toward the secondary boom, a follower slidingly engaging the guide track and including means for connecting the follower to the secondary boom so as to guide the secondary boom along the track, and a wood splitting wedge on the track opposed to the secondary boom so that when the two booms are swung toward each other the wedge is driven through a wood stick pushed along the track by the secondary boom.

DRAWINGS

FIG. 1 is a side elevation of a backhoe with a wood splitter attachment according to the invention;

FIG. 2 is an enlarged side elevation of the attachment; and

FIG. 3 is a plan view of the attachment as shown in FIG. 2.

DESCRIPTION

FIG. 1 shows an automotive backhoe tractor or chassis A on which is mounted a backhoe main boom 1 and a secondary boom or dipperstick 2. The secondary boom 2 is pivotted to the main boom and is swung in the direction of the arcuate arrow 2* toward and from the main boom by a cylinder 4 and piston rod 6 reciprocating between a midcap 7 on the main boom 1 and a drive pin 8 on the secondary boom 2.

The attachment of the present invention includes a pivot plate 9 secured by bolts 11 to the bottom of the main boom 1. The pivot plate 9 includes two yoke pieces 12 between which an I-beam 13 is pivotted on a pin 14. The I-beam, shown in section at the right of FIG. 2, has two vertical members 13A and a median connecting member 13B. The upper edges of the I-beam members 13A form a guide track for receiving a log L so that the log can slide between the members 13A toward a splitting wedge assembly 16.

The lower edges of the I-beam members 13A further form a guide track for an I-beam follower yoke 17 attached by bolts 18 to the lower end of the dipperstick or secondary backhoe boom 2. The follower yoke extends below the I-beam to a journal for an axle 19. Two wheels 21 on the axle 19 engage the spaced under edges of the I-beam members 13A and guide the secondary boom 2 in its arcuate movement 2* to and from the main boom 1 by the drive of the piston 4.

Between the free, right end of the I-beam 13 and its pivot 14 on the plate 9 the wood splitting wedge assembly 16 is secured to the I-beam as by bolts 22. The wedge assembly is spaced at least forty-eight inches from the free end of the I-beam to accept a cord length log between the lower end of the secondary boom 2 and the wedge assembly 16 while the boom is guided on the track of the I-beam.

In operation a log or stick is cradled between opposite upper edges 13A of the I-beam 13 and between the lower end of the secondary backhoe beam 2 and the wedge assembly 16. The backhoe is then controlled to swing the dipperstick or secondary boom 2 toward the main boom 1, thereby to act as a pusher for the log L and drive the wedge assembly through the log L thereby splitting it completely as the secondary boom reaches the wedge assembly. A stop 23 below the I-beam 13 will prevent the secondary boom from damaging the wedge.

Whereas prior apparatus designed specially for splitting logs was relatively expensive and of little use for other purposes, the present attachment for a backhoe and the combination therewith is relatively moderate in expense as an attachment and compatible with backhoe equipment generally available where wood is to be split.

It should be understood that the present disclosure is for the purpose of illustration only and that this invention includes all modifications and equivalents which fall within the scope of the appended claims.

I claim:

1. A wood splitting attachment for a backhoe having a main boom and a secondary boom pivotted thereto, the attachment comprising:

an elongate guide track, means for mounting the track on the backhoe extending toward the secondary boom, a follower slidingly engaging the guide track and including means for connecting the follower to the secondary boom so as to guide the secondary boom along the track, and a wood splitting wedge on the track opposed to the secondary boom so that when the two booms are swung toward each other the wedge is driven through a wood stick pushed along the track by the secondary boom.

2. An attachment according to claim 1 wherein the track forms a guide for the wood stick.

3. An attachment according to claim 1 wherein the wood splitting wedge is located between the mounting means at one end of the track and the opposite end of the track.

4. An attachment according to claim 1 wherein the track forms a guide for the follower.

5. An attachment according to claim 1 wherein the follower comprises a yoke having means engaging an undersurface of the track.

6. An attachment according to claim 5 wherein the follower comprises rollers engaging the undersurface of the track.

7. An attachment according to claim 1 wherein the track mounting means includes a pivot.

8. An attachment according to claim 1 wherein the track is mounted on the backhoe main boom.

9. Wood splitting apparatus comprising:

a backhoe type of vehicle including a main boom and a secondary boom pivotted thereto, and motor means for pivotting the two booms toward each other, an elongate guide track, means for mounting the track on the backhoe extending toward the secondary boom, a follower slidingly engaging the guide track and including means for connecting the follower to the secondary boom so as to guide the secondary boom along the track, and a wood splitting wedge on the track opposed to the secondary boom so that when the two booms are swung toward each other the wedge is driven through a wood stick pushed along the track by the secondary boom.

* * * * *